Sept. 23, 1952 N. MOLINARE 2,611,413
TOOL FOR MANUFACTURING SPIRAL GROOVE TUBING
Filed July 25, 1949 2 SHEETS—SHEET 1

INVENTOR.
NICHOLAS MOLINARE
BY
ATTORNEY

Sept. 23, 1952 — N. MOLINARE — 2,611,413
TOOL FOR MANUFACTURING SPIRAL GROOVE TUBING
Filed July 25, 1949
FIG. 1
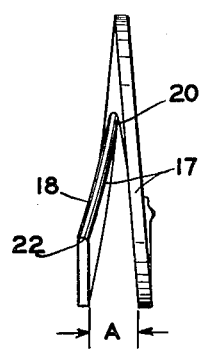
FIG. 2
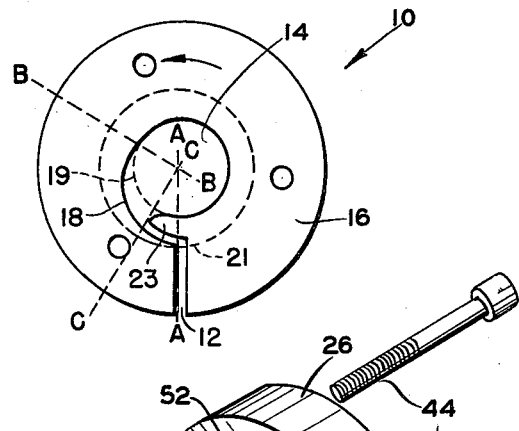
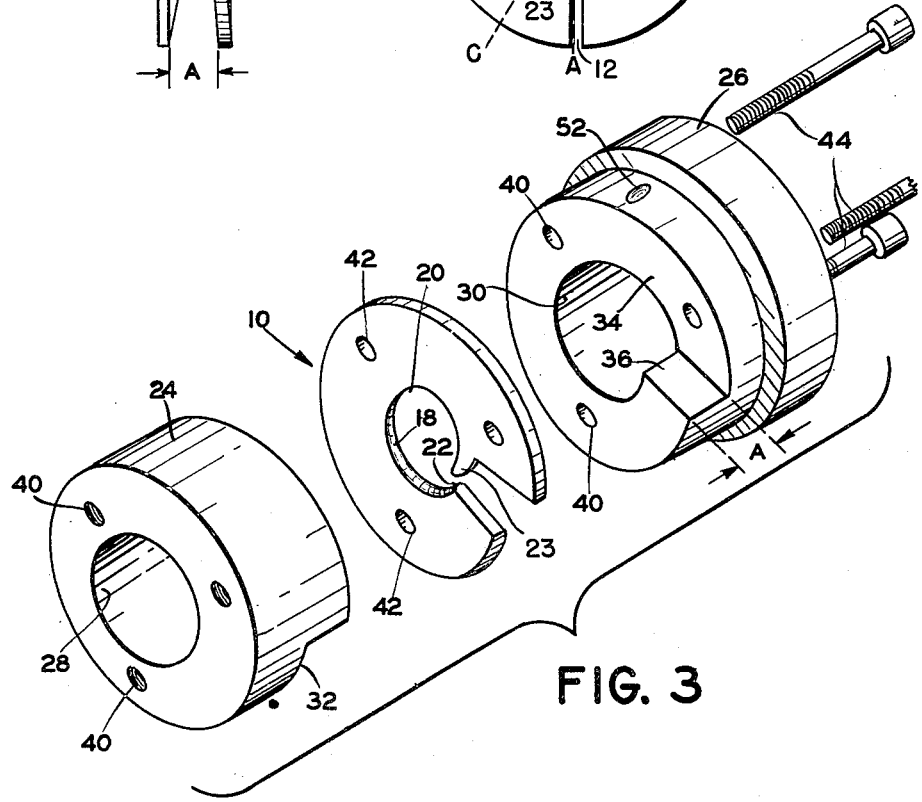
FIG. 3
INVENTOR.
NICHOLAS MOLINARE
BY
ATTORNEY Patented Sept. 23, 1952

2,611,413

UNITED STATES PATENT OFFICE 2,611,413

TOOL FOR MANUFACTURING SPIRAL GROOVE TUBING

Nicholas Molinare, Nutley, N. J., assignor to Bendix Aviation Corporation, Teterboro, N. J., a corporation of Delaware Application July 25, 1949, Serial No. 106,672

2 Claims. (Cl. 153—71)

The present invention relates to methods for corrugating tubing and more particularly to tube corrugating tools and apparatus.

Heretofore in the art, the problem of corrugating metal tubing and hose has been solved by the employment of precise and expensive tools which required costly dies for their manufacture, and accordingly, the services of skilled diemakers. Then, because of the nature of the tools, generally of the clamping jaw type with a plurality of internal corrugations of gradually increasing depth, and because of the severe usage imposed thereon, the useful life of the tool was relatively short and the corrugating process was relatively slow, thereby increasing still further the cost of the process.

It is, therefore, one of the objects of the present invention to provide a tool for accomplishing the corrugation of metal tubing and hose whereby the foregoing disadvantages are eliminated, and to do so by novel and effective means.

Another object of the invention is to provide a tool for corrugating tubing whereby the pitch of the corrugations shall be easily controlled.

Still another object of the invention is to provide a tool of the above-indicated nature capable of impressing a deeper corrugation in the tubing, thereby increasing its flexibilty.

Another object of the invention is to provide a tool for corrugating metal tubing which will permit the corrugating process to be effectively accomplished at a greater speed than permitted by similar tools heretofore.

Still another object of the invention is to provide a tool for the manufacture of corrugated flexible metal tubing and hose which shall be readily expendible and replaceable upon the wearing or impairment thereof.

Still another object of the invention is to provide a tool for manufacturing corrugated flexible metal tubing or hose which shall be simple and inexpensive to manufacture, facile and practical to employ and yet positive and reliable in operation.

Still another object of the invention is to provide a tool of the above-indicated nature which shall accomplish the corrugating process by forming, rather than drawing, the tubing, thereby producing a superior corrugated tube of more uniform structure.

Still another object of the invention is to provide a novel tool for corrugating tubing whereby a single blade accomplishes the forming operation, thereby substantially eliminating friction due to a minimum surface of the work being in contact with the blade.

The foregoing and other objects and advantages will appear more fully hereinafter from a consideration of the detailed description which follows, taken together with the accompanying drawings, wherein one embodiment of the invention is illustrated by way of example. It is to be expressly understood, however, that the drawings are for the purpose of illustration only, and are not to be construed as defining the limits of the invention.

Referring to the drawings, wherein like reference characters designate like parts, Figure 1 is a front view of the single helical involute forming blade.

Figure 2 is a side view of Figure 1.

Figure 3 is an exploded isometric view of the tool and holders showing the holding relation therebetween.

Figure 4:
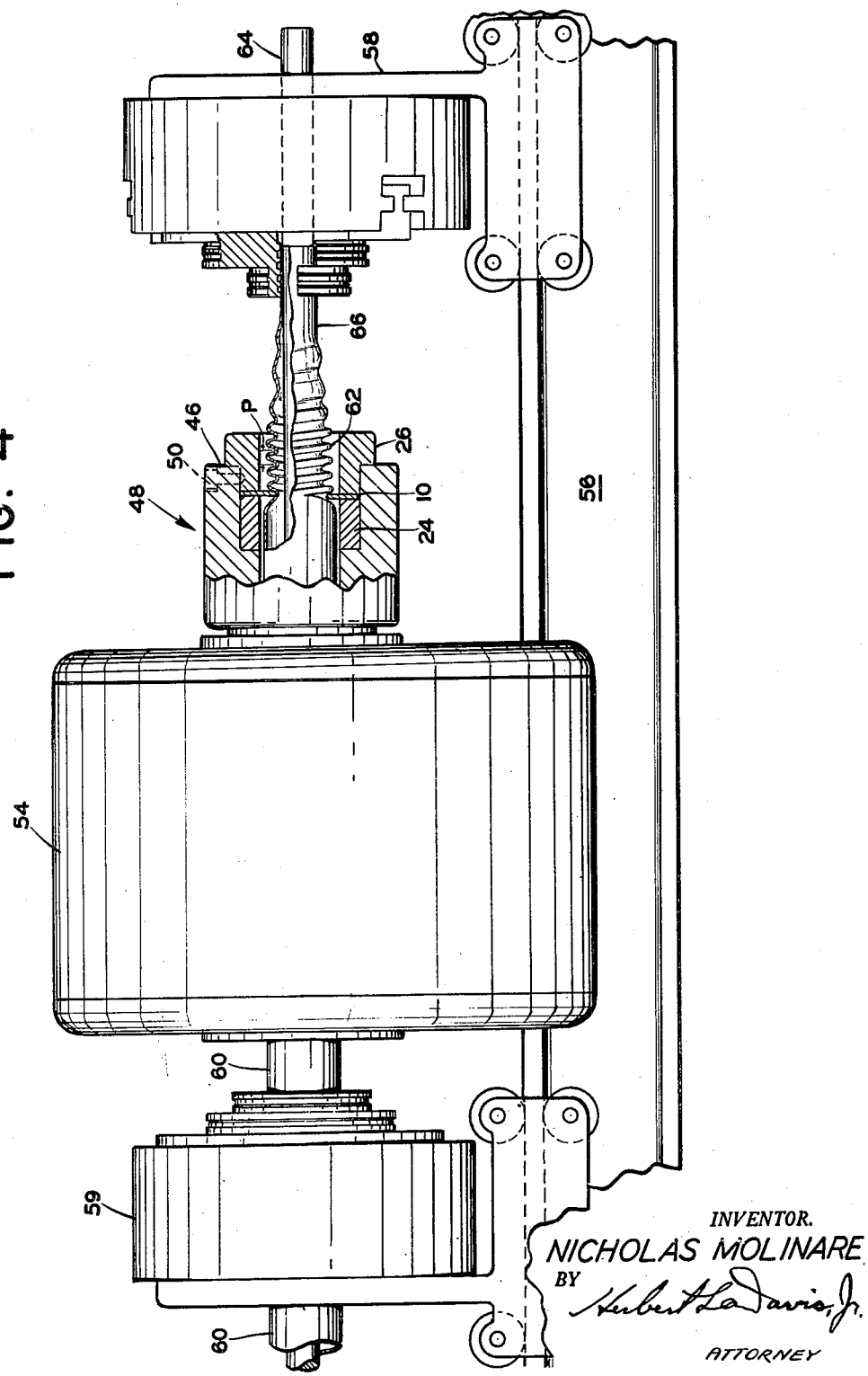
Figure 4 is a view of the tool and holder installed in operating relation in a tube corrugating machine.

Referring now to the drawings and more particularly to Figures 1 and 2, a cutting blade generally designated by the numeral 10 is formed from a flat piece of standard gage material, preferably steel, although any other hard material may be used to equal advantage as hereinafter described.

A radial split 12 (Figure 2) in the tool 10 extends from its outer contour to the center circular hole 14, and the flat surface 16 is sprung to form a helical involute 17 of desired pitch, such as, for example, the distance A, and the forming surface 18 likewise composes a helix 20, the projection of which on a flat plane, as seen in Figure 1, is the circular hole 14, of the same diameter as that of the tubing as ultimately corrugated by the tool 10.

The corners 22 of the forming surface 18 are rounded off or shaped in a suitable manner (Figure 1) to insure against cutting or damaging the tubing during the forming process.

As the tool 10 is rotated relative to the tube in the direction indicated in Figure 2 by the arrow, it will form in the tubing a continuous helical rib or corrugation comprising lands and trough portions. The leading portion of the blade of the tool, that is the portion extending clockwise from the line A—A to the line B—B, carries the inwardly tapered working or leading edge 18, whereas the inner or trailing edge of the trailing part or portion of the tool extends clockwise from the line B—B to the line C—C and is of constant diameter. In Figure 2 the position of the trough of the rib which will be formed in the tube by the tool, is indicated diagrammatically by the dotted line 19 and the land portion is indicated by the dotted line 21.

An appendage portion 23, that is the portion extending clockwise from the line A—A to the line C—C, projects within the radius of the inwardly tapered working or leading edge 18 so as to provide a support for the land portion of the corrugated tube and permits a more gradual blending of the inwardly tapered working edge 18 with the inner edge of the trailing portion of the tool. The appendage portion 23 provides a support for the newly formed land portion of the tube formed between the working edge 18 and the trailing edge 20 and prevents the working edge 18 from forcing a portion of the tubing into the trough portion of the corrugated tube in which the appendage portion 23 rides and from forcing the tubing toward the radial split 12. Thus, the appendage portion 23 serves to support the corrugated metal between the leading edge 18 and the trailing edge of the tool 10 so as to assure the formation of uniform corrugations in the tubing.

Referring now to Figure 3, a cylindrical pair of jaws 24 and 26 adapted to firmly hold the forming tool 10, contain center holes 28 and 30, respectively, of the same diameter as the center 14 projected by the helix 20. The mating surfaces 32 and 34 of the jaws 24 and 26 are cut to match the helix 17 so that the height of the step 36 formed thereby is identical to the distance A. A number of through holes 40 in the holding jaws 24 and 26 are spaced to match the holes 42 in the tool 10 so that by means of screws 44, the tool 10 may be firmly clamped in place between the jaws 24 and 26.

The manner in which tubes are corrugated by means of the apparatus described herein is shown by referring to Figure 4, wherein the forming tool 10, firmly clamped within its holding jaws 24 and 26, is installed in the revolving spindle 46 of a lathe generally indicated by the numeral 48, by means of bolt 50 extending through the spindle 46 into a threaded hole 52 especially provided in the jaw 26 for the purpose.

The lathe 48 is of a type commonly known in the art and comprises a turning motor 54 and an I-beam shaped cradle 56 along which rolling carriage chucks 58 and 59 are free to roll.

Having thus described the invention, it will now be apparent to those skilled in the art that when a length of tubing 60 is inserted through the lathe spindle 46 and through the hole 14 in the forming blade 10, and the lathe 48 is started and a slight initial pressure applied to the tubing towards the right to commence operations, the forming tool 10, revolving in the spindle 46, will start to corrugate the tubing 60. The formed tubing 62 thereafter will continue to pour from the lathe spindle 46 under its own power, being propelled by the helical involute forming blade 10 in much the same way and manner as a screw passes through a nut.

A supporting bar 64 is inserted through the tubing 60 and is in turn fixed into, and supported by, the rolling carriage chucks 58 and 59, thereby preventing sagging of the tubing and insuring that it is fed through the lathe 48 in a normal direction. To facilitate the start of the corrugating operation, the end of the tubing 60 is swaged as indicated generally at 66, to a diameter which will readily permit the tubing to be threaded a substantial distance through the hole 14 in the helical involute forming tool 10. The swaged portion is then clamped into the rolling carriage chuck 58, thereby holding the tubing horizontal and preventing turning thereof. The propelling action is supplied by the die itself.

In this manner it will be readily apparent that by fixing the distance A to a desired value, the pitch P of the corrugations may be easily and positively controlled. The friction produced by a corrugating tube or die of the type heretofore employed in the art is very great, and it will be readily seen that by use of the single blade helical tool 10 contemplated in the present invention, this friction is materially reduced since at all times a minimum surface of the work is in contact with the forming blade 18. This reduced friction enables the work to pass through the revolving lathe spindle 46 and the forming tube 10 at substantially greater speed than previous tools heretofore.

The forming tool 10 is subjected to the greatest wear of any part of the machine inasmuch as it comes into direct frictional contact with the tube 60 during the corrugating process, however, the useful life of this component may be materially lengthened by tempering it to a very hard condition, or by plating it with some hard protective element such as chromium, for example. When the forming tool 10 becomes worn, instead of the necessity of cutting a new die, which is an expensive operation, the worn helix is removed from its holding jaws 24 and 26, and a new one inserted. It will be apparent that in the same fashion, working helixes differing in dimension or form adapted to produce corrugations of different depth or pitch, may readily be substituted together with their respective jaws, in the lathe spindle 46.

There is thus provided a tool for corrugating metal hose which is simple and economical to manufacture and replace, effective and efficient in operation, and which accomplishes the corrugating process with greater speed and precision so as to produce a superior finished tube.

Although only one embodiment and one application of the invention has been illustrated and described, other changes and modifications in the form and relative arrangement of parts which will be apparent to those skilled in the art may be made without departing from the spirit and scope of the invention.

What is claimed is:

1. A tool for forming a flexible corrugated metal tube, comprising a single blade, said blade being of helical convolute form and having a leading edge and a trailing edge, an appendage portion of said blade for supporting the metal of the tubing between the leading and trailing edges so as to effect uniform corrugations in the tubing, a pair of mounting jaws for said blade, the mating surfaces of said jaws matching the helical contour of said blade, a plurality of registered clamping holes through said blade and said jaws, and fastening means passing through said registered openings for securing said blade in working position between the mating surfaces of said jaws.

2. A tool for corrugating metal tubes, comprising a single helical convolute form blade having a leading edge and a trailing edge, said blade being of predetermined pitch and having an appendage portion at the trailing edge for supporting a portion of the corrugated tubing between the leading edge and the trailing edge, the edges of said blade being rounded, a pair of holding jaws for said blade, the mating surfaces of said jaws matching the helical contour of said blade, and means for securing said blade in working position between the mating surfaces of said jaws.

NICHOLAS MOLINARE.

REFERENCES CITED

The following references are of record in the file of this patent:

UNITED STATES PATENTS

| Number | Name | Date |
|---|---|---|
| 390,899 | Pratt et al. | Oct. 9, 1888 |
| 1,919,254 | Picece et al. | July 25, 1933 |
| 2,037,378 | Guarnaschelli | Apr. 14, 1936 |
| 2,157,598 | Frentress et al. | May 9, 1939 |
| 2,496,790 | Guarnaschelli | Feb. 7, 1950 |

FOREIGN PATENTS

| Number | Country | Date |
|---|---|---|
| 663,061 | Germany | July 28, 1938 |